United States Patent
Sterin et al.

(10) Patent No.: US 11,137,924 B2
(45) Date of Patent: Oct. 5, 2021

(54) DISTRIBUTED FILE STORAGE SYSTEM SUPPORTING ACCESSES FROM MULTIPLE CONTAINER HOSTS

(71) Applicant: VMware, Inc., Palo Alto, CA (US)

(72) Inventors: Mark Sterin, Mountain View, CA (US); Prashant Dhamdhere, Milpitas, CA (US); Miao Luo, Sunnyvale, CA (US); Shivanshu Goswami, Stony Brook, NY (US); Tushar Thole, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 198 days.

(21) Appl. No.: 16/047,900

(22) Filed: Jul. 27, 2018

(65) Prior Publication Data

US 2019/0065096 A1    Feb. 28, 2019

Related U.S. Application Data

(60) Provisional application No. 62/550,403, filed on Aug. 25, 2017.

(51) Int. Cl.
  *G06F 3/00*    (2006.01)
  *G06F 3/06*    (2006.01)
  (Continued)

(52) U.S. Cl.
  CPC .......... *G06F 3/0643* (2013.01); *G06F 3/0604* (2013.01); *G06F 3/067* (2013.01);
  (Continued)

(58) Field of Classification Search
  None
  See application file for complete search history.

(56) References Cited

U.S. PATENT DOCUMENTS 8,413,146 B1 *  4/2013  McCorkendale ... G06F 9/45558
                                                711/6
8,621,069 B1 * 12/2013  Tompkins ............. G06F 9/5027
                                                709/224

(Continued)

OTHER PUBLICATIONS

Nedim Mehic, How to install and configured File Server Resource Manager (FSRM)—Part1, available at https://nedimmehic.org/2017/04/10/how-to-install-and-configure-file-server-resource-manager-fsrm-part1/ (Year: 2017).*

*Primary Examiner* — Craig S Goldschmidt
(74) *Attorney, Agent, or Firm* — Patterson + Sheridan, LLP

(57) ABSTRACT

Techniques are disclosed for providing a distributed file storage system that permits containerized applications running in distinct container hosts to read/write to the same storage volume. In one embodiment, a file sharing volume service is configured to use a container orchestrator to start a respective file server for each shared storage volume mounted for use by user-level containerized application(s). The file sharing volume service further manages the file server by creating and updating a metadata entry that specifies (1) a count of a number of times the shared storage volume has been mounted for use, and (2) a port number exposed for use in mounting path(s) to access the shared storage volume. Upon receiving a request to run a containerized application with the shared storage volume, the file sharing volume service updates the metadata entry to increase the count, and retrieves and uses the port number to mount path(s) for accessing the shared storage volume.

25 Claims, 5 Drawing Sheets

(51) Int. Cl.
*G06F 9/455* (2018.01)
*G06F 16/182* (2019.01)

(52) U.S. Cl.
CPC .......... *G06F 3/0614* (2013.01); *G06F 3/0644* (2013.01); *G06F 9/45533* (2013.01); *G06F 9/45558* (2013.01); *G06F 16/182* (2019.01); *G06F 16/1824* (2019.01); *G06F 2009/45579* (2013.01)

(56) References Cited

U.S. PATENT DOCUMENTS

| | | | | |
|---|---|---|---|---|
| 9,983,860 | B1* | 5/2018 | Koty | H04L 67/10 |
| 2004/0225952 | A1* | 11/2004 | Brown | G06F 8/20 |
| | | | | 714/819 |
| 2005/0044233 | A1* | 2/2005 | Cai | H04L 61/1558 |
| | | | | 709/227 |
| 2015/0121371 | A1* | 4/2015 | Gummaraju | G06F 9/45558 |
| | | | | 718/1 |

\* cited by examiner

DISTRIBUTED FILE STORAGE SYSTEM SUPPORTING ACCESSES FROM MULTIPLE CONTAINER HOSTS

CROSS-REFERENCE TO RELATED APPLICATIONS

This application claims priority to U.S. provisional application having Ser. No. 62/550,403, filed on Aug. 25, 2017, which is hereby incorporated by reference in its entirety.

BACKGROUND

Computer virtualization is a technique that involves encapsulating a physical computing machine platform into virtual machine(s) executing under control of virtualization software on a hardware computing platform or "host." A virtual machine (VM) provides virtual hardware abstractions for processor, memory, storage, and the like to a guest operating system. The virtualization software, also referred to as a "hypervisor," includes one or more virtual machine monitors (VMMs) to provide execution environment(s) for the VM(s). As physical hosts have grown larger, with greater processor core counts and terabyte memory sizes, virtualization has become key to the economic utilization of available hardware.

VMs provide for hardware-level virtualization. Another virtualization technique is operating system-level (OS-level) virtualization, where an abstraction layer is provided on top of a kernel of an operating system executing on a host computer. Such an abstraction is referred to herein as a "container." A container provides for the isolation of a group of processes from others on an operating system. By making use of existing operating system functionality (such as Linux™ name spaces), containers maintain their own private view of the operating system, file system structure, and network interfaces. Containers share the operating system kernel with other processes, but can be constrained to some extent to use an amount of resources such as the central processing unit (CPU), random access memory (RAM), or input/output (I/O) devices. Containers typically have a small system "footprint." That is, containers provide a relatively thin encapsulation layer above and beyond any applications contained therein.

Traditionally, some storage devices, and in particular block devices, can be attached to only one VM at a time. Such storage devices cannot be accessed simultaneously by applications running in different VMs, including applications running in containers in those VMs. While a file sharing system can be used to expose the storage devices to multiple VMs, setting up a file sharing system typically requires nontrivial manual efforts. Further, multiple applications may start/stop using the shared storage device at various times, creating a scalability problem if a user must manually track the statuses of storage devices and applications. In addition, typical file systems that are used to expose storage devices to multiple VMs do not provide failover protection, so if such a file sharing system fails, applications accessing the system will fail as well.

SUMMARY

One or more embodiments disclosed herein include a method for providing a distributed file storage system. The method generally includes, responsive to receiving a first request to run an application with a shared storage volume: launching a file server that exposes a port via which the shared storage volume can be accessed; mounting the shared storage volume for use by the application or services thereof, wherein the mounting of the shared storage volume includes mounting at least one path through the port exposed by the file server, and wherein the application or the services thereof access the shared storage volume via the at least one mounted path; and increasing a stored count of a number of times the shared storage volume has been mounted based on the mounting of the at least one path.

Further embodiments include a non-transitory computer-readable storage medium storing instructions that when executed by a computer system cause the computer system to perform the method set forth above, and a computer system programmed to carry out the method set forth above.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

DETAILED DESCRIPTION

Embodiments presented herein provide a scalable and highly available distributed file storage system that permits containerized applications running in distinct container hosts, such as virtual machines (VMs), to simultaneously read/write to the same storage volume, such as the same block device. Storage volumes which can be simultaneously accessed by distinct container hosts are referred to herein as "shared" storage volumes. In one embodiment, a file sharing volume service is configured to use a container orchestrator (e.g., Docker® swarm) to start a respective file server for each shared storage volume mounted for use by user-level containerized application(s). The file sharing volume service further manages the file server by creating and updating, in a key-value store, a metadata entry that specifies (1) a count of a number of times the shared storage volume has been mounted for use, and (2) a port number that is exposed by the file server for use in mounting path(s) used to access the shared storage volume. When a request is received to run a containerized application with the shared storage volume, the file sharing volume service retrieves and uses the port number specified in the metadata entry to mount a path from the file server to itself so that the mounted path can be used to access the shared storage volume. File accesses from containerized applications to the shared storage volume may then be forwarded to the file server, which redirects such accesses to the shared storage volume. Further, the file sharing volume service updates the metadata entry to increase the count of the number of times the shared storage volume has been mounted for use. Conversely, the key-value store entry's count may be decremented as containerized applications are terminated and the shared storage volume is unmounted on container host(s) in which no containerized applications require access to the shared storage volume, until the count associated with the shared storage volume reaches 0, at which point the file sharing volume service stops the file server.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
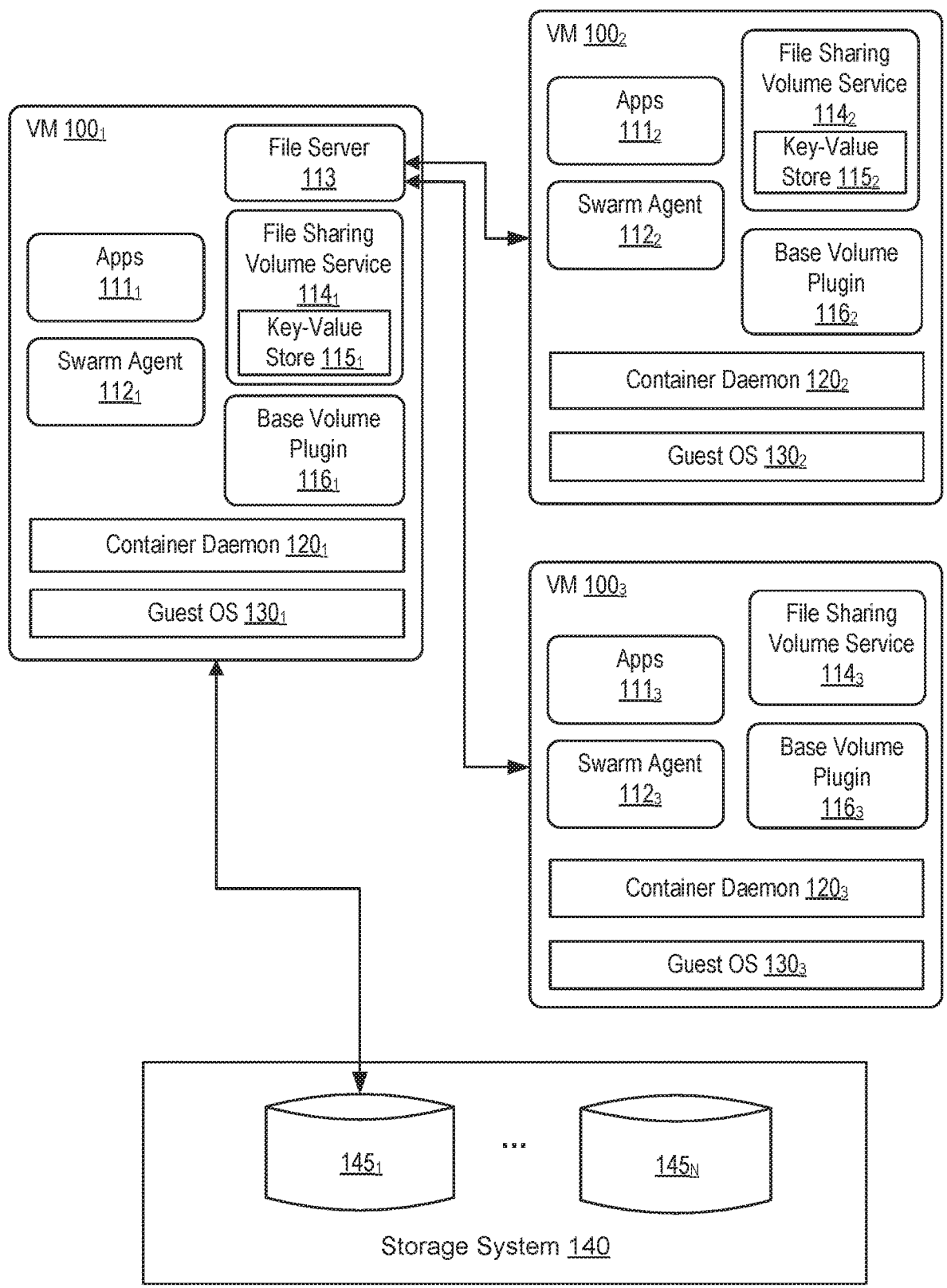
FIG. 1 illustrates an approach for providing a distributed file storage system, according to an embodiment.

FIG. 1 illustrates an approach for providing a distributed file storage system, according to an embodiment. As shown, a number of virtual machines $100_{1-3}$ each include a respective guest operating system (OS) 120, container daemon 120, swarm agent $112_{1-3}$, base volume plugin $116_{1-3}$, file sharing volume service $114_{1-3}$, and other user-level applications $111_{1-3}$. Swarm agents $112_{1-3}$, base volume plugins $116_{1-3}$, file sharing volume services $114_{1-3}$, and each of the user-level applications $111_{1-3}$ may run in respective containers in one embodiment. It should be understood that multiple VMs (e.g., VMs $100_{1-3}$) may run concurrently on the same (or different) physical host computer(s). In particular, VMs $100_{1-3}$ may run on top of software interface layer(s), referred to herein as hypervisors, that enable sharing of underlying hardware resources of host computer(s) by VMs. Further, VMs $100_{1-3}$ may be part of the same swarm in one embodiment.

Illustratively, containerized applications $111_{1-3}$ running in VMs $100_{1-3}$ require access to the same shared storage volume $145_1$, which may be a block storage device such as a .vmdk file in one embodiment. Containerized applications $111_{1-3}$ may include distinct application(s) and/or services of the same application(s) that run in different containers, such as a master-worker scenario in which worker containers process data that is then aggregated by a master container, a map reduce algorithm in which one worker container writes intermediate data to a file that another worker container reads, or an image storage solution such as Docker® Trusted Registry that spawns multiple worker containers which all read from a file system storing a collection of images.

A respective guest OS $130_{1-3}$ (which may be, e.g., Microsoft Windows® or Linux™) runs in each of VMs $100_{1-3}$, and one or more guest applications and processes may run top of each guest OS $130_{1-3}$. As shown, container daemons $120_{1-3}$ run as guest applications under the control of guest OSes $130_{1-3}$. Each container daemon 120 is a process that enables the deployment and management of containers by providing a layer of operating-system-level virtualization on the corresponding guest OS $130_{1-3}$. As described, containers are software instances that enable virtualization at the OS level. With containerization, the kernel of an OS that manages a host computer is configured to provide multiple isolated user space instances. These instances, referred to as containers, appear as unique servers from the standpoint of an end user that communicates with the containers. However, from the standpoint of the OS that manages the host computer on which the containers execute, the containers are user processes that are scheduled and dispatched by the operating system. Examples of container daemons include the open-source Docker® platform made available by Docker, Inc. and Linux™ Containers (LXC).

In order for containerized applications running in distinct VMs to read and write to the same storage volume, shown as storage volume $145_1$, file accesses from user-level containerized applications to that storage volume $145_1$ are forwarded to file server 113, and file server 113 then redirects such accesses to the shared storage volume $145_1$. In one embodiment, a file sharing volume service utilizes a container orchestrator to start a distinct file server (e.g., file server 113) for each storage volume being shared. In alternative embodiments, the container orchestrator may be used to start file server(s) that can each service multiple shared storage volumes. The file server(s) may be run as service(s) of the container orchestrator, and the container orchestrator will restart such file server(s) if they crash.

As shown, a container orchestrator is implemented using swarm agents $112_{1-3}$, which may themselves run inside containers. Container orchestrators, also referred to as container orchestration tools, are generally used to manage containers across an infrastructure, including across VMs and host computers. That is, container orchestrators allow a user to deploy, scale, upgrade, remove, or otherwise manage containers, thereby simplifying container management and providing a framework for defining container deployment and the ability to manage multiple containers. In addition, container orchestrators may provide networking support, such as an overlay network with virtual Internet Protocol (IP) addresses, for the containers managed by the container orchestrators. Example container orchestrators include those available from Docker Swarm®, Kubernetes®, OpenShift®, Cloud Foundry®, and Mesos®. A container orchestrator may be implemented using swarm agents, such as the agents $112_{1-3}$ shown in FIG. 1, with one or more swarm agents being configured as managers that perform central management functions for the container orchestrator, such as scheduling, high availability, and the like, and other swarm agents being configured as workers that communicate with the managers and manage the lifecycles of containers. In addition, one of the swarm agents may be configured as a leader that manages manager swarm agents and resolves conflicts.

File sharing volume services $114_{1-3}$ are plugins to container daemon $120_{1-3}$ and run above base volume plugins $116_{1-3}$ in VMs $100_{1-3}$. Such container daemon plugins may run in containers, but are not user-visible applications. Base volume plugins $116_{1-3}$ may themselves be container daemon plugins that are drivers responsible for providing access to storage volumes in particular platform(s). Each virtualization platform, such as a vSphere®, Azure®, NetApp®, or Google® platform, typically requires a corresponding volume plugin to access storage in that platform's environment. However, traditional volume plugins only support attachment of a storage volume to a single VM. As a result, containerized applications, or the services of a single application running in different containers, that run in distinct VMs could not read/write to the same storage volume at the same time as other containerized applications (or services thereof). In one embodiment, file sharing volume services $114_{1-3}$ are drivers that solve this problem by allowing containers running in distinct container hosts (e.g., VMs) to simultaneously access the same shared storage volume. Further, file sharing volume services $114_{1-3}$ are generic, i.e., file sharing volume services $114_{1-3}$ can work with different platforms that provide volume plugins.

In one embodiment, the file sharing volume services running in VMs that include manager swarm agents (also referred to herein as "manager VMs" or "manager nodes") may be configured to include, or communicate with, key-value stores that maintain metadata about shared storage volumes. Although described herein primarily with respect to such key-value stores, other types of databases may be used in alternative embodiments. The metadata stored in the key-value stores (or other databases) may indicate the statuses of shared storage volumes, counts (also referred to herein as "reference counts") of the number of times the shared storage volumes have been mounted for use, and port numbers through which the shared storage volumes may be accessed, among other things. Illustratively, file sharing volume services $114_1$ and $114_2$ in manager VMs $100_1$ and $100_2$ include key-value stores $116_1$ and $116_2$, respectively. For example, the key-value stores $116_{1-2}$ may be etcd key-value stores. In one embodiment, the file sharing volume service configured as the leader, which manages manager swarm agents and resolves conflicts, may be responsible for starting the key-value store in manager VMs, and the file sharing volume services running in manager VMs (also referred to herein as "manager file sharing volume services") may communicate to synchronize their key-value stores with each other. It should be understood that, by maintaining key-value stores in only manager VMs, there is less overhead required to, e.g., synchronize key-value stores in the manager VMs, as opposed to synchronizing key-value stores in all the VMs of a swarm.

As discussed in greater detail below, when a request is received by file sharing volume service (e.g., file sharing volume service $114_1$, $114_2$, or $114_3$) to create a shared storage volume, the file sharing volume service adds a new metadata entry with reference count 0 to a key-value store (e.g., key-value store $115_1$ and/or $115_2$), and the file sharing volume service then requests that the base volume plugin (e.g., base volume plugin $116_1$, $116_2$, or $116_3$) create an internal volume. Subsequently, when a request is received by the file sharing volume service to run a containerized application with the shared storage volume, the file sharing volume service (1) updates the metadata entry to increase the reference count, and (2) retrieves a port number that file server 113 listens to, with the port number then being used to mount the shared storage volume for use by the containerized application or by services of the application running in containers in distinct VM. In addition, prior to the mounting of the shared storage volume for the first time, a manager file sharing volume service may launch file server 113 using the container orchestrator, which automatically handles load balancing by starting file server 113 in a VM that has a relatively lower workload. In turn, file sharing volume services may mount the shared storage volume to their local network addresses (e.g., their IP addresses) while exposing a port through which other applications can mount the shared storage volume. In particular, when a local application or service thereof needs to access the shared storage volume, file sharing volume services $114_2$ and $114_3$ running in other VMs $100_2$ and $100_3$ may check a key-value store maintained by a manager file sharing service (e.g., file sharing volume service $114_1$) to identify the exposed port number with file server 113 running on it, and then file sharing volume services $114_2$ and $114_3$ may each mount a path to itself, i.e., mount a path on the local VM, through the port number.

In one embodiment, a distinct file server may be started for each shared storage volume in one embodiment so that a different port number can be used for sharing each shared storage volume. In alternative embodiments, the container orchestrator may be used to start file server(s) that can each service multiple shared storage volumes. Conversely, the shared storage volume may be unmounted on container host(s) when containerized applications therein are terminated and/or otherwise no longer require access to the shared storage volume, and the corresponding key-value store entry's reference count is decremented as a result of such unmounting, until the reference count becomes 0 and a manager file sharing volume service stops file server 113 to conserve resources. It should be understood that the file server may be started again if another application needs to access the shared storage volume.

Mounting of the shared storage volume only occurs on container hosts in which application containers using the shared storage volume are running. For example, assume an application includes services running in containers a1, a2, a3, and a4, with a1 and a2 running in virtual machine VM1 and a3 and a4 running in virtual machine VM2, and each of the containers requires access to a shared storage volume v1. Then, when container a1 is started, shared storage volume v1 may be mounted to virtual machine VM1, but when container a2 is started, shared storage volume 1 is already mounted to virtual machine VM1, so no further action is taken. Similarly, when container a3 is started, shared storage volume v1 may be mounted to virtual machine VM2, but when container a4 is started, shared storage volume v1 is already mounted to virtual machine VM2, so no further action is taken.

Figure 2:
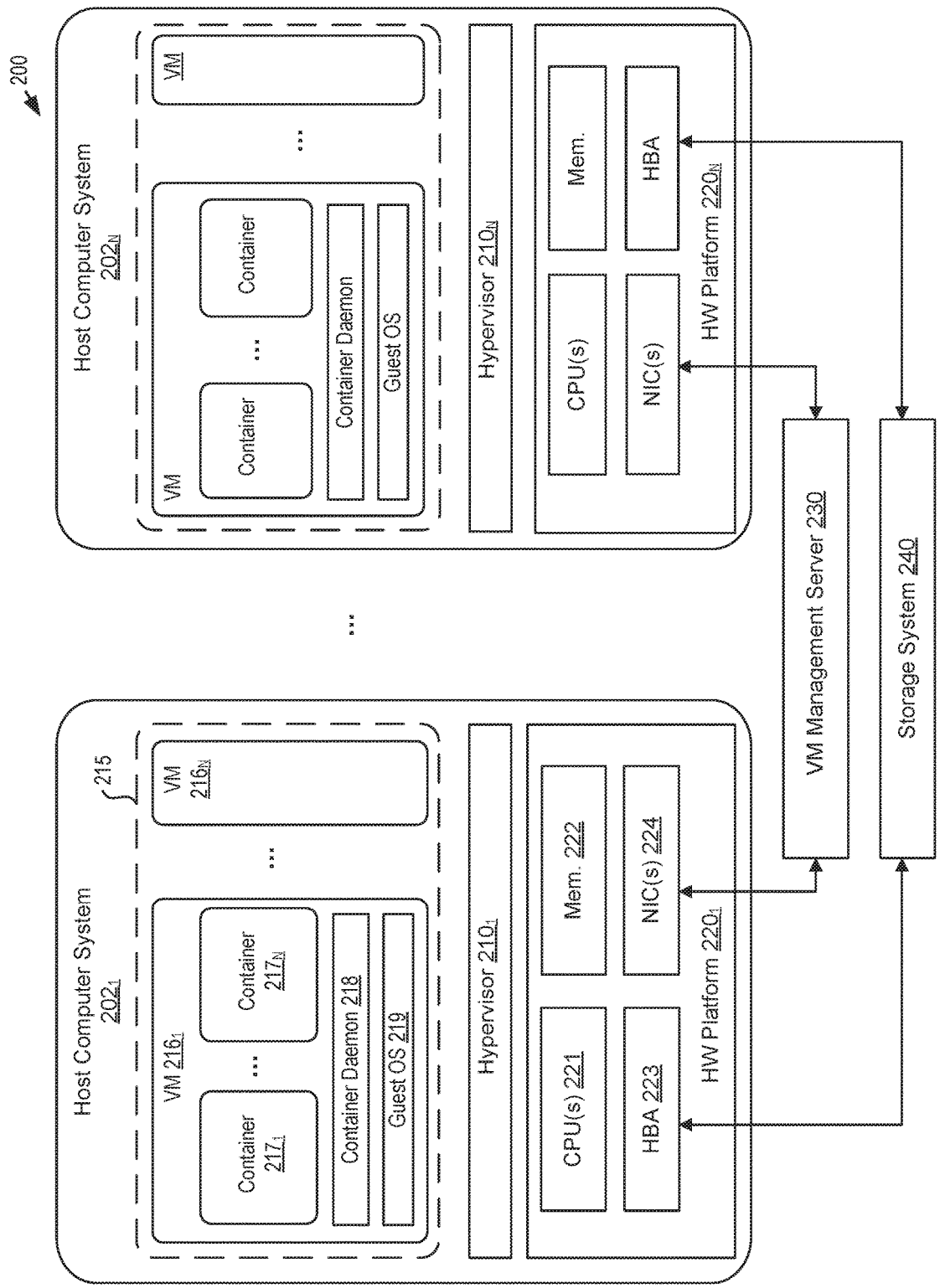
FIG. 2 illustrates a system with which one or more embodiments may be utilized.

FIG. 2 illustrates a system 200 with which one or more embodiments may be utilized. As illustrated, system 200 includes host computers $202_{1-N}$. In general, one or more host computers 202 may be arranged in an interconnected server system such as a data center or cloud. Each of the host computers $202_{1-N}$ is configured to provide a virtualization layer that abstracts computing resources of a hardware platform into multiple virtual machines (e.g., VMs $216_{1-N}$) that run concurrently on the same host. Illustratively, hardware platform 220 of host $202_1$ includes CPU 221, memory 222, host bus adapter (HBA) 223, networking interface 224, and other conventional components of a computing device, and the hardware platforms of other hosts 202 may include similar components. VMs $216_{1-N}$ run on top of hypervisor $210_1$ that enables sharing of the hardware resources of host 202 by the virtual machines. One example of hypervisor $210_1$ that may be used in an embodiment described herein is a VMware ESXi™ hypervisor provided as part of the VMware vSphere® solution made commercially available from VMware, Inc. of Palo Alto, Calif. Hypervisor $210_1$ provides a device driver layer configured to map physical resource of hardware platforms 220 to "virtual" resources of each VM 216 such that each VM 216 has its own corresponding virtual hardware platform. Each such virtual hardware platform 220 provides emulated hardware (e.g., memory, processor, storage, network interface, etc.) that may, for example, function as an equivalent, conventional hardware architecture for its corresponding VM. In some embodiments, virtual hardware platforms $220_{1-N}$ may be considered part of virtual machine monitors (VMMs) which implement virtual system support to coordinate operations between hypervisor $210_1$ and corresponding VMs $216_{1-N}$.

Hypervisor $210_1$ may run on top of a host operating system of host computer 202 or directly on hardware components of host 102. Further, each VM 216 includes a guest operating system (e.g., guest OS 219), such as Microsoft Windows® or Linux™, and one or more guest applications and processes may run on top of the guest operating system.

In one embodiment, each (or some) of the VMs 216 includes a container daemon 218 installed therein and running as a guest application under control of the guest OS. As described, container daemons are processes that enable the deployment and management of containers by providing a layer of operating-system-level virtualization on the guest OS within a VM, and containers are software instances that enable virtualization at the OS level. Illustratively, each VM 216 is configured to run one or more virtual containers 217 therein that are instantiated on that VM 216 by a container daemon. Each such container 217 then runs as an isolated process in userspace on the guest OS, sharing the kernel of the guest OS with other containers. For example, each container 217 may include a package (sometimes referred to as an "image") of pre-installed application code and any binaries and libraries used for the execution of that application code to create a virtualized application. In some cases, a container may be a blank image into which applications may be installed or launched.

As shown, computing system 200 further includes virtualization management module 230 that is in communication with host computers $202_{1-N}$. Virtualization management module 230 is configured to carry out administrative tasks for computing system 200, including managing hosts $202_{1-N}$, managing VMs running within each host 202, provisioning VMs, migrating VMs from one host to another host, and load balancing between hosts $202_{1-N}$. In one embodiment, virtualization management module 230 is a computer program that resides and executes in a central server, which may reside in computing system 200, or alternatively, run as a VM in one of hosts $202_{1-N}$. One example of virtualization management module 230 is the vCenter Server® product made available from VMware, Inc.

Computing system 200 further includes a storage system 240, which in one embodiment is a shared storage that is accessible, e.g., through the host bus adapters (e.g., HBA 223) of host computer systems $200_{1-N}$. In a particular embodiment, storage system 240 may be a vSAN™ storage platform, which uses server-based disk drives and flash devices to create its own shared pool of storage and provides high availability, among other things. It should be understood, however, that techniques disclosed herein may also be applied to other types of storage systems.

In one embodiment, storage system 240 maintains shared storage volumes that can be simultaneously accessed by containerized applications and/or services of application(s) that run in containers in distinct VMs. To permit such simultaneous access, a file sharing volume service, which may run in, e.g., one of virtual containers $217_{1-N}$ in either a manager or worker VM, is configured to use a container orchestrator to start a respective file server for each shared storage volume mounted for use by user-level containerized application(s). When a request is received to run a containerized application with a shared storage volume, the file sharing volume service (1) updates a metadata entry in a key-value store to increment a count of the number of times that shared storage volume has been mounted, and (2) retrieves a port number exposed by the file server corresponding to the shared storage volume, the port number being used to mount at least one path to access the shared storage volume. File accesses from containerized applications to the shared storage volume may subsequently be forwarded to the file server, which redirects such accesses to the shared storage volume. As a result, containerized applications and/or services of application(s) running in containers in distinct VMs can access the same shared storage volume simultaneously. In addition, as the file server runs as a container, the container orchestrator may provide the typical load balancing, high availability, automatic network failover, scalability, service discovery, etc. for the file server, which may be combined with the benefits of a highly reliable underlying storage system (e.g., storage system 240) that provides reliability for shared storage volumes stored therein.

Figure 3:
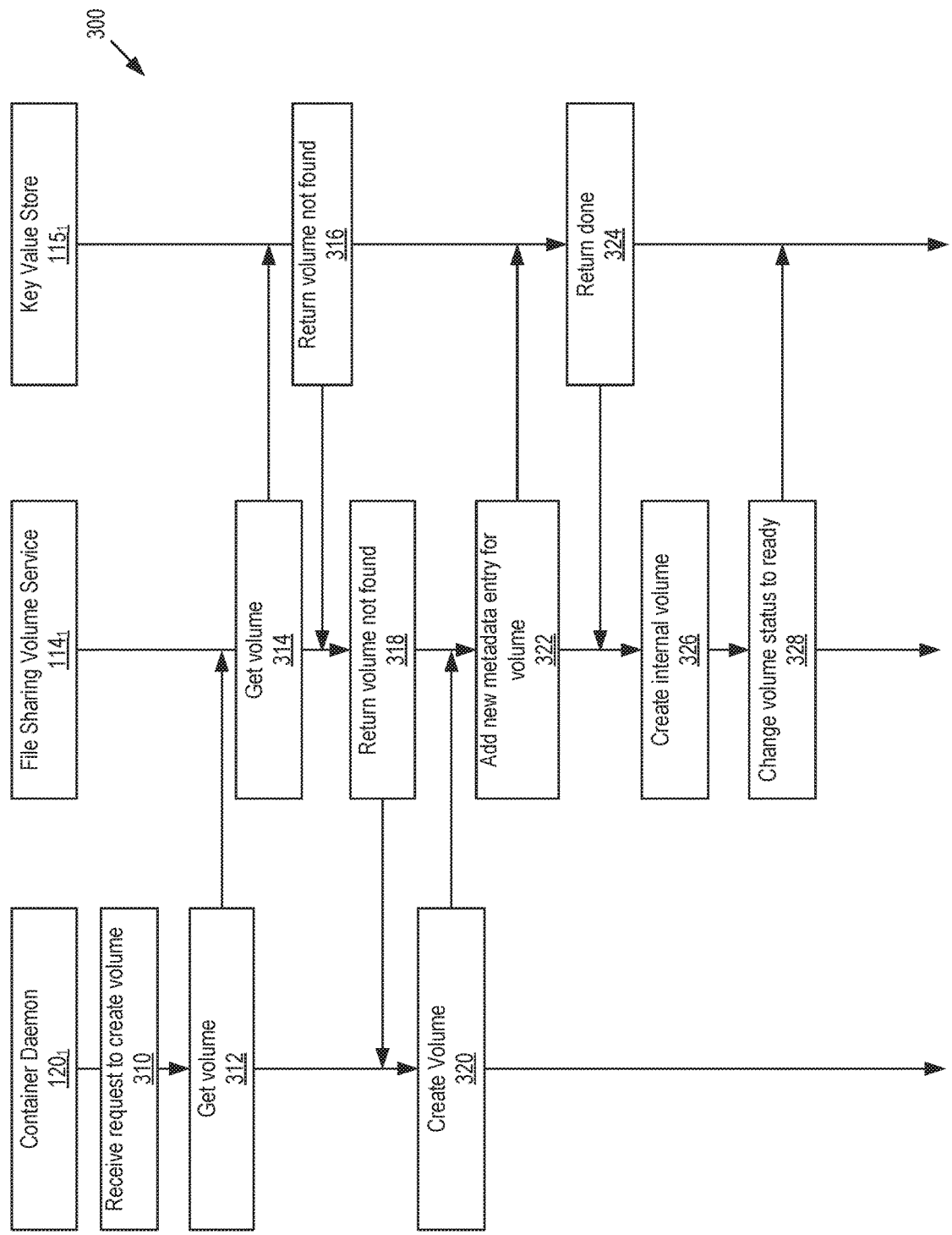
FIG. 3 illustrates a method of creating a shared storage volume, according to an embodiment.

FIG. 3 illustrates a method 300 of creating a shared storage volume, according to an embodiment. As shown, method 300 begins at step 310, where container daemon $120_1$ receives a request to create a shared storage volume. For example, a user may enter the Docker® command docker volume create -driver=v-file -name=shavol1 -o size=10 gb, which requests the creation of a 10-gigabyte volume named "shavol1" and registering of the volume with the file sharing volume service "v-file" such that v-file is used to access the created volume. In one embodiment, the volume that is created may be a block storage device, such as a .vmdk file. Although container daemon $120_1$ is shown as receiving the request to create the shared storage volume, it should be understood that any manager or worker node may receive such a request and create the shared storage volume.

At step 312, container daemon $120_1$ requests that file sharing volume service $114_1$ get the same storage volume that container daemon $120_1$ received a request to create. This is to check whether a storage volume with the same name has already been created. To get the same storage volume, file sharing volume service $114_1$ queries key-value store $115_1$ for the storage volume at step 314. Assuming the storage volume has not yet been created, then key-value store $115_1$ returns that the storage volume is not found at step 316.

At step 318, container daemon $120_1$ requests that file sharing volume service $114_1$ create a new shared storage volume based on the request received at step 310. For example, container daemon $120_1$ may use the unix socket to communicate with the Docker® daemon dockerd in a particular embodiment and launch a Samba server (as a container running the cluster) with the following command: docker service create --network samba-network --name samba-1 -p 1139:139 -p 1445:445 -p 1137:137 --mount type=volume,source=shavol1_internal,dst=/exports dperson/samba -s "public;/exports;yes;no;yes;foo;foo;foo" -u "foo;bar".

At step 320, file sharing volume service $114_1$ adds a new metadata entry for the new shared storage volume to key-value store $115_1$. In one embodiment, the new metadata entry may include a status of "creating" and a reference count of 0, indicating that the storage volume is being created and has not been mounted for use by any containerized application.

At step 322, file sharing volume service $114_1$ further creates an internal volume. In one embodiment, file sharing volume service $114_1$ first checks for the internal platform base volume plugin, which in this case would be base volume plugin $116_1$. File sharing volume service $114_1$ then requests that base volume plugin $116_1$ create the internal volume by, e.g., invoking an application programming interface (API) provided by container daemon $120_1$. Although a manager file sharing volume service $114_1$ is shown as creating the internal volume, it should be understood that any manager or worker file sharing volume service may create the volume.

Subsequent to creating the base volume at step 322, file sharing volume service $114_1$ changes the status of the key-value store entry corresponding to the shared storage volume to "ready" at step 324, indicating the volume has been created and is ready for mounting. However, if volume creation fails, then file sharing volume service $114_1$ may remove the metadata entry added at step 320 and return a failure.

Figure 4:
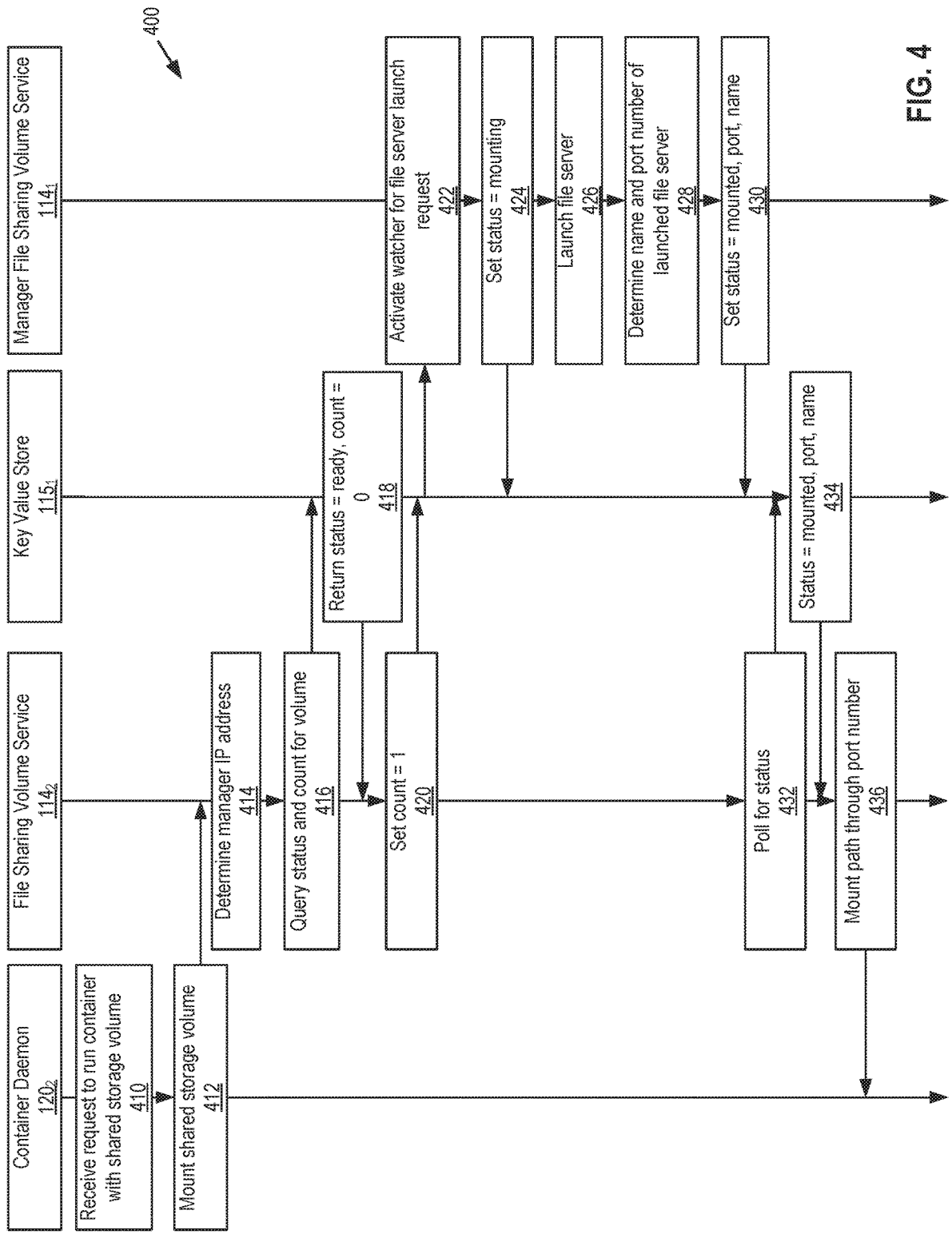
FIG. 4 illustrates a method of mounting a shared storage volume for the first time, according to an embodiment.

FIG. 4 illustrates a method 400 of mounting a shared storage volume for the first time, according to an embodiment. As shown, method 400 begins at step 410, where container daemon $120_2$ receives a request to run a container with a shared storage volume. For example, a user may enter the command docker run shavol1:/mnt/vol myapp, which requests running of the "myapp" application with the volume "shavol1" mounted at the path /mnt/vol. Although container daemon $120_2$ is shown as receiving the request to create the shared storage volume, it should be understood that either a manager or worker node may receive such a request and perform steps to mount a shared storage volume.

At step 412, container daemon $120_2$ requests that file sharing volume service $114_2$ mount the volume. Container daemon $120_2$ knows to use file sharing volume service $114_2$, as shared storage volumes (e.g., "shavol1") may be created and registered with the file sharing volume service, as discussed above with respect to step 318 of method 300.

At step 414, file sharing volume service $114_2$ determines the IP addresses of manager nodes. This optional step is performed by file sharing volume services running in worker nodes (e.g., file sharing volume service $114_2$), which may invoke an API provided by container daemon $120_1$ to obtain the manager node IP addresses. As described above, file sharing volume services running in worker nodes do not include their own key-value stores, so such file sharing volume services need to obtain shared storage volume information from manager file sharing volume services that do include key-value stores.

At step 416, file sharing volume service $114_2$ queries for the status and reference count of the shared storage volume, using the IP address(es) determined at step 414. By contrast, if a container daemon running in a manager node (e.g., container daemon $120_1$) had received the request to run the container with the shared storage volume, then the manager file sharing volume service in that manager node may query its own key-value store for the status and reference count of the shared storage volume. However, file sharing volume service $114_2$ runs in a worker node and does not include such a key-value store, so file sharing volume service $114_2$ may check one by one with each manager file sharing volume service (e.g., manager file sharing volume services $114_1$ and $114_3$), until a manager file sharing volume service returns the requisite status and reference count information.

At step 418, the status of the shared storage volume and reference count are returned by a manager node's key-value store $115_1$. As shown, the returned status is "ready" and the returned reference count value is 0, indicating that the volume is ready for mounting and this is the first mount.

At step 420, file sharing volume service $114_2$ sets the reference count value in key-value store $115_1$ to 1. In one embodiment, the reference count is updated every time the corresponding shared storage volume is mounted for use by a containerized application or unmounted, in which case the reference count is decremented.

Then at step 422, a watcher in manager file sharing volume service, which is shown for illustrative purposes as file sharing volume service $114_1$, is activated for a file server launch request. In one embodiment, the activated watcher continuously watches, on all keys associated with shared storage volumes in key-value store $115_1$, the reference counters for those shared storage volumes. In response to a reference counter being updated from 0 to 1, indicating that the associated shared storage volume is being mounted for the first time, the watcher starts an event handler to handle the mounting.

At step 424, the event handler that is started in file sharing volume service $114_1$ updates the status of the key-value store entry corresponding to the shared storage volume to "mounting." Then, at step 426, the event handler in file sharing volume service $114_1$ launches a file server in a container. In one embodiment, file sharing volume service $114_1$ invokes an API provided by container daemon $120_1$ to start the file server. For example, file sharing volume service $114_1$ may invoke the Docker® API to start the file server as a Docker® swarm service. After being started, the file server may register to use a particular port opened on VMs $100_{1-3}$.

At step 428, the event handler in file sharing volume service $114_1$ determines the name of the launched file server and the port number that the file server listens to. In one embodiment, the event handler may invoke an API provided by container daemon $120_1$ to obtain the file server name and the port number that the file server listens to, among other things.

At step 430, the event handler in file sharing volume service $114_1$ updates the key-value store entry for the shared storage volume to include a "mounted" status, the name of the launched file server, and the port number that the launched file server listens to. As described, file server names and port numbers that file servers listen to may be maintained in metadata entries in key-value stores, such as key-value store $115_1$. Paths from the launched file server may then be mounted on other VMs using the port number, and containerized applications running in those VMs may then access the shared storage volume via the mounted paths. In one embodiment, the key-value store entry may also be updated with a user and password, attached node name, and mounted node name, which may also be obtained by invoking the API provided by container daemon $120_1$, discussed above.

At step 432, file sharing volume service $114_2$ polls for the status of the shared storage volume from key-value store $115_1$. Although shown for simplicity as occurring after step 432, it should be understood that file sharing volume service $114_2$ may continuously poll for the shared storage volume's status after updating the reference count value at step 420, until the status has changed to "mounted." In response to the polling by file sharing volume service $114_2$, key-value store $115_1$ returns, at step 434, the "mounted" status of the shared storage volume, as well as the port number exposed by the associated file server and the name of the file server.

At step 436, file sharing volume service $114_2$ mounts a path to itself (i.e., to its local IP address) through the received port number. In one embodiment, the mounting of the path may require a username and password. In such a case, the username and password may be maintained in key-value store $115_1$ and thereafter retrieved from key-value store $115_1$ to mount the path. Further, the same username and password may be employed for all users, or different usernames and passwords may be set for different users for security purposes. After mounting the path to itself at step 436, file sharing volume service $114_2$ may return the mounted path to container daemon $120_2$, after which user-level containerized applications (e.g., "myapp") may access the shared storage volume via the mounted path. In particular, access requests via the mounted path may be forwarded to the file server that then redirects those requests to the shared storage volume. Further, the requests may be routed via an overlay network provided by the container orchestrator (e.g., Docker® swarm).

Figure 5:
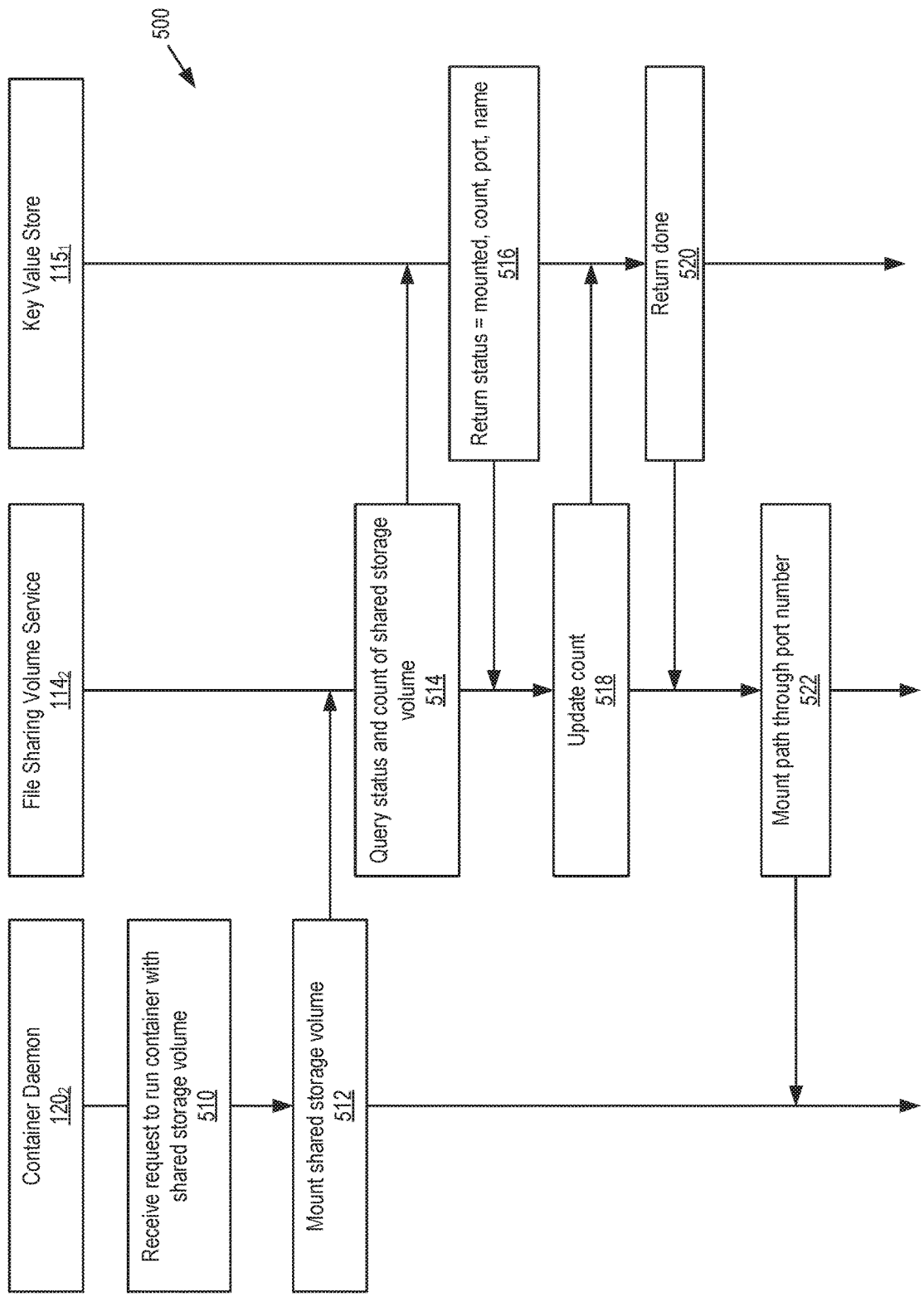
FIG. 5 illustrates a method of mounting a previously-mounted shared storage volume, according to an embodiment.

FIG. 5 illustrates a method 500 of mounting a previously-mounted shared storage volume, according to an embodiment. As shown, method 500 begins at step 510, where container daemon $120_2$ receives a request to run a container with a shared storage volume. For example, a user may enter a command to run the container with the shared storage volume, similar to the command described above with respect to step 410 of method 400. Although container daemon $120_2$ is shown for illustrative purposes as receiving the request at step 510, any manager or worker node may receive such a request and perform steps to mount a shared storage volume in response to the request.

At step 512, container daemon $120_2$ requests that file sharing volume service $114_2$ mount the shared storage volume. In response, file sharing volume service $114_2$ queries key-value store $115_1$ (or key-value store $115_2$) for the status and reference count of the shared storage volume at step 514. Similar to step 414 of method 400, file sharing volume service $114_2$ may first determine the IP addresses of manager nodes, as file sharing volume service $114_2$ runs in a worker node that does not include its own key-value store. File sharing volume service $114_2$ may then query a key-value store in one of those manager nodes, shown as key-value store $115_1$ in manager node $100_2$, using its IP address, in order to determine the status and reference count of the shared storage volume.

At step 516, key-value store $115_1$ returns the status of the shared storage volume as "mounted," as well as the current reference count, the name of the file server, and the port number that the file server listens to. The returned reference count value will be greater than 0, as the shared storage volume was previously mounted for use.

At step 518, file sharing volume service $114_2$ updates the reference count in the key-value store $115_1$ entry associated with the shared storage volume. In one embodiment, file sharing volume service $114_2$ increments the current reference count by one every time the shared storage volume is mounted for use. Key-value store $115_1$ then returns that the update of the reference count is done at step 520.

At step 522, file sharing volume service $114_2$ mounts a path to itself (i.e., to its local IP address) through the port number received at step 516. For example, in a particular embodiment file sharing volume service $114_2$ may use the following Docker® command to mount to the path /[mntPath] according to the port number and local IP address: mount -t cifs -o username=foo,password=bar,port=1445 // [localIP]/public /[mntPath]. Similar to the discussion above with respect to step 434 of method 400, user-level containerized applications may then access the shared storage volume via the mounted path, with access requests being forwarded to the file server that then redirects those requests to the shared storage volume. Further, similar to the discussion above with respect to step 436, the mounting of the path at step 522 may require a username and password in one embodiment, and such a username and password may be maintained in key-value store $115_1$ and retrieved therefrom to mount the path.

Although one file sharing volume service $114_2$ is described above as mounting a path to itself, any number of file sharing volume services in distinct VMs may mount paths to themselves by performing steps similar to steps 514-522 if, e.g., a containerized application includes multiple services that run in distinct VMs or multiple containerized applications running in distinct VMs need to access the same shared storage volume.

FIGS. 4-5 illustrate the mounting of a shared storage volume. However, a shared storage volume may also be unmounted when containerized applications stop using the shared storage volume, by performing essentially the opposite steps. In one embodiment, file sharing volume services may unmount a shared storage volume as containerized applications stop using the shared storage volume whenever a container host has no remaining containerized applications that require access to the shared storage volume, and decrement a reference count in the corresponding key-value store entry whenever the shared storage volume is unmounted. In such a case, the file sharing volume services may also check whether the reference count has been decremented to 0, indicating that the shared storage volume is no longer in use, in which case the file server associated with the shared storage volume may be stopped to conserve resources.

In some embodiments, actions other than creating shared storage volumes, running applications with shared storage volumes, and removing such applications may be permitted. Such actions may include, e.g., listing and inspecting shared storage volumes. For example, in response to the receipt of a listing or inspection request, such as the request "docker volume inspect shavol1" to inspect shared storage volume "shavol1," a manager file sharing volume service may query its key-value store and return a list of shared storage volumes and/or other information (in the case of an inspect request), such as reference counts, identifiers (IDs), port numbers, names, attached node (e.g., VM) names, and so on.

Although described above primarily with respect to containerized applications and container hosts that are VMs, it should be understood that techniques disclosed herein may be applied to applications that do not run in containers and/or hosts that are not VMs. For example, rather than being containerized applications, the applications or services thereof may simply run on guest operating systems in distinct VMs and require simultaneous access to the same data storage volume. As another example, the hosts in which containerized applications (or non-containerized applications) that require access to the same data storage volume run may be physical computing systems rather than VMs, or some combination of physical computing systems and VMs.

Advantageously, techniques disclosed herein permit containerized applications or services thereof that run in multiple container hosts, such as distinct VMs, to read/write to the same data storage volume, such as the same block device, simultaneously. In particular, file servers are run in containers created and managed by a container orchestrator, which may provide load balancing, high availability, automatic network failover, scalability, and service discovery, among other things. Further, these benefits may be combined with a highly reliable underlying storage system that provides reliability for shared storage volumes stored therein. In addition, the file sharing volume service and file server may be transparent to users (and user-level applications), who are not required to make configuration changes to enable sharing of storage volumes or to track how many or what containerized applications are using shared storage volumes. Nor is an expensive network attached storage (NAS) required.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, NAS, read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A computer-implemented method for providing a distributed file storage system, the method comprising:
receiving a first request to run a first application that executes on a first container and a second container that simultaneously access a remote data storage using a shared storage volume, the first container being one of a first plurality of containers that execute in a first virtual machine (VM) and the second container being one of a second plurality of containers that execute in a second VM, the remote data storage comprising a shared pool of storage devices accessed by applications running on different host machines;
in response to receiving the first request, launching a file server that exposes a port via which the shared storage volume can be accessed by the first and second containers;
mounting the shared storage volume for use by the first and second containers, wherein the mounting of the shared storage volume includes mounting a first path through the port exposed by the file server to the first VM on which the first container executes and mounting a second path through the port to the second VM on which the second container executes, and wherein the first and second containers access, respectively, the shared storage volume via the first and second mounted paths; and increasing a stored count of a number of times the shared storage volume has been mounted based on the mounting of the first and second paths, wherein the stored count is indicative of when to stop the file server.

2. The method of claim 1, wherein the first VM and second VM each run a respective container orchestrator service, and each of the first and second paths is mounted to a respective one of the container orchestrator services.

3. The method of claim 2, wherein each of the respective container orchestrator services includes, or is in communication with, a database storing a metadata entry that specifies (a) the stored count of the number of times the shared storage volume has been mounted, and (b) a port number of the exposed port via which the shared storage volume can be accessed.

4. The method of claim 3, further comprising, responsive to receiving a listing or inspection request, querying the database for at least one of a list of shared storage volumes, reference counts associated with the shared storage volumes, identifiers of the shared storage volumes, port numbers via which the shared storage volumes can be accessed, names of the shared storage volumes, and names of nodes attached to the shared storage volumes.

5. The method of claim 2, wherein the file server runs in a third container in the first VM.

6. The method of claim 5, wherein the first and second VMs are part of a swarm.

7. The method of claim 1, further comprising:
responsive to receiving a second request to run a second application running on a third container that simultaneously accesses the remote data storage using the shared storage volume:
determining that the shared storage volume was previously mounted,
mounting the shared storage volume for use by the third container associated with the second application or services thereof, wherein the mounting of the shared storage volume for use by the third container associated with the second application or services thereof includes mounting at least one additional path through the port exposed by the file server, and wherein the third container associated with the second application or the services thereof accesses the shared storage volume via the at least one additional mounted path, and
increasing the stored count based on the mounting of the at least one additional path.

8. The method of claim 7, wherein the stored count is associated with a stored status of the shared storage volume, wherein determining that the shared storage volume was previously mounted is based on the stored status indicating the shared storage volume is mounted.

9. The method of claim 7, wherein the third container is hosted in a third VM, wherein the at least one additional path is mounted to the third VM.

10. The method of claim 1, further comprising:
responsive to determining that the first application has been terminated:
unmounting the first and second mounted paths, and decrementing the stored count to zero based on the unmounting of the first and second mounted paths.

11. The method of claim 10, further comprising, responsive to determining the stored count has been decremented to zero, stopping the file server.

12. The method of claim 1, wherein the shared storage volume is a block device.

13. The method of claim 1, wherein the first and second VMs run on the same host machine.

14. The method of claim 1, further comprising:
receiving a second request to run a second application running on a third container of a third plurality of containers that simultaneously access a second remote data storage using a second shared storage volume;
determining that the second shared storage volume has not been previously mounted;
launching a second file server that exposes a second port via which the second shared storage volume can be accessed,
mounting the second shared storage volume for use by the third container associated with the second application or services thereof, wherein the mounting of the second shared storage volume includes mounting a third path through the second port exposed by the second file server, and wherein the third container associated with the second application or the services thereof accesses the second shared storage volume via the third mounted path; and
increasing a second stored count based on the mounting of the second third path.

15. The method of claim 14, wherein the third container is hosted in the first VM.

16. A non-transitory computer-readable storage medium storing instructions, which when executed by a computer system, perform operations for providing a distributed file storage system, the operations comprising:
receiving a first request to run a first application that executes on a first container and a second container that simultaneously access a remote data storage using a shared storage volume, the first container being one of a first plurality of containers that execute in a first virtual machine (VM) and the second container being one of a second plurality of containers that execute in a second VM, the remote data storage comprising a shared pool of storage devices accessed by applications running on different host machines;
in response to receiving the first request, launching a file server that exposes a port via which the shared storage volume can be accessed by the first and second containers;
mounting the shared storage volume for use by the first and second containers, wherein the mounting of the shared storage volume includes mounting a first path through the port exposed by the file server to the first VM on which the first container executes and mounting a second path through the port to the second VM on which the second container executes, and wherein the first and second containers access, respectively, the shared storage volume via the first and second mounted paths; and
increasing a stored count of a number of times the shared storage volume has been mounted based on the mounting of the first and second paths, wherein the stored count is indicative of when to stop the file server.

17. The computer-readable storage medium of claim 16, wherein the first VM and second VM each run a respective container orchestrator service, and each of the first and second paths is mounted to a respective one of the container orchestrator services.

18. The computer-readable storage medium of claim 17, wherein each of the respective container orchestrator services includes, or is in communication with, a database storing a metadata entry that specifies (a) the stored count of the number of times the shared storage volume has been mounted, and (b) a port number of the exposed port via which the shared storage volume can be accessed.

19. The computer-readable storage medium et claim 17, wherein the file server runs in a third container in the first VM.

20. The computer-readable storage medium of claim 19, wherein the first and second VMs are part of a swarm.

21. The computer-readable storage medium of claim 16, the operations further comprising:
responsive to receiving a second request to run a second application running on a third container that simultaneously accesses the remote data storage using the shared storage volume:
determining that the shared storage volume was previously mounted,
mounting the shared storage volume for use by the third container associated with the second application or services thereof, wherein the mounting of the shared storage volume for use by the third container associated with the second application or services thereof includes mounting at least one additional path through the port exposed by the file server, and wherein the third container associated with the second application or the services thereof accesses the shared storage volume via the at least one additional mounted path, and
increasing the stored count based on the mounting of the at least one additional path.

22. The computer-readable storage medium of claim 16, the operations further comprising:
responsive to determining that the application has been terminated:
unmounting the first and second mounted paths, and
decrementing the stored count to zero based on the unmounting of the first and second mounted paths.

23. The computer-readable storage medium of claim 22, the operations further comprising, responsive to determining the stored count has been decremented to zero, stopping the file server.

24. The computer-readable storage medium of claim 16, wherein the shared storage volume is a block device.

25. A system, comprising:
a processor; and
a memory, wherein the memory includes an application program configured to perform operations for providing a distributed file storage system, the operations comprising:
receiving a first request to run an application that executes on a first container and a second container that simultaneously access a remote data storage using a shared storage volume, the first container being one of a first plurality of containers that execute in a first virtual machine (VM) and the second container being one of a second plurality of containers that execute in a second VM, the remote data storage comprising a shared pool of storage devices accessed by applications running on different host machines;
in response to receiving the first request, launching a file server that exposes a port via which the shared storage volume can be accessed by the first and second containers;
mounting the shared storage volume for use by the first and second containers, wherein the mounting of the shared storage volume includes mounting a first path through the port exposed by the file server to the first VM on which the first container executes and mounting a second path through the port to the second VM on which the second container executes, and wherein the first and second containers access, respectively, the shared storage volume via the first and second mounted paths; and
increasing a stored count of a number of times the shared storage volume has been mounted based on the mounting of the first and second paths, wherein the stored count is indicative of when to stop the file server.

* * * * *